United States Patent [19]

Flintoff

[11] 4,207,299

[45] Jun. 10, 1980

[54] SULPHUR DIOXIDE REMOVAL PROCESS

[75] Inventor: John F. Flintoff, Middlesbrough, England

[73] Assignee: Davy Powergas, Inc., Lakeland, Fla.

[21] Appl. No.: 937,973

[22] Filed: Aug. 30, 1978

Related U.S. Application Data

[63] Continuation of Ser. No. 769,400, Feb. 16, 1977, abandoned.

[51] Int. Cl.$^2$ .................... C01B 17/00; C01D 3/06; C01B 17/45; C01D 5/00

[52] U.S. Cl. .................................. 423/242; 423/182; 423/512 A; 423/551

[58] Field of Search ............... 423/242 A, 244 A, 551, 423/242 R, 244 R, 182, 512 A

[56] References Cited

U.S. PATENT DOCUMENTS

3,971,844  7/1976  Schneider ..................... 423/242 A

FOREIGN PATENT DOCUMENTS

489745  8/1938  United Kingdom ................ 423/242 A

OTHER PUBLICATIONS

"Design" Saemen, Industrial & Engineering Chemistry, 1961, pp. 617, 620.

*Primary Examiner*—O. R. Vertiz
*Assistant Examiner*—Gregory A. Heller
*Attorney, Agent, or Firm*—Bernard & Brown

[57] ABSTRACT

Sodium sulfate is purged from a sulfur dioxide removal system involving contact of a sulfur dioxide-containing gas with a solution containing sodium sulfite to absorb sulfur dioxide from the gas. The spent absorbing solution is regenerated by desorbing sulfur dioxide, and recycled for further use. To avoid an unduly large build-up of sulfate in the system, a portion of the absorbing-desorbing medium, e.g., spent absorbing solution, containing sodium sulfate, a relatively large amount of sodium bisulfite, and generally a minor amount of sodium sulfite, is treated to precipitate solids containing sodium sulfate in a concentration which is greater on a dry basis than would otherwise be obtained in the absorption-desorption cycle. The concentration of sodium sulfate in the precipitated solids is increased by providing a portion of the precipitated sodium sulfate-containing solids, e.g. about 25 to 75 weight percent, in solution in the absorbing-desorbing medium treated for sulfate removal. Preferably, sulfate removal is accomplished by reducing the amount of water in the portion of the absorbing-desorbing medium treated so that only sufficient solids are precipitated from said medium to comprise up to about 10, or up to about 20, weight percent of the medium.

15 Claims, 1 Drawing Figure

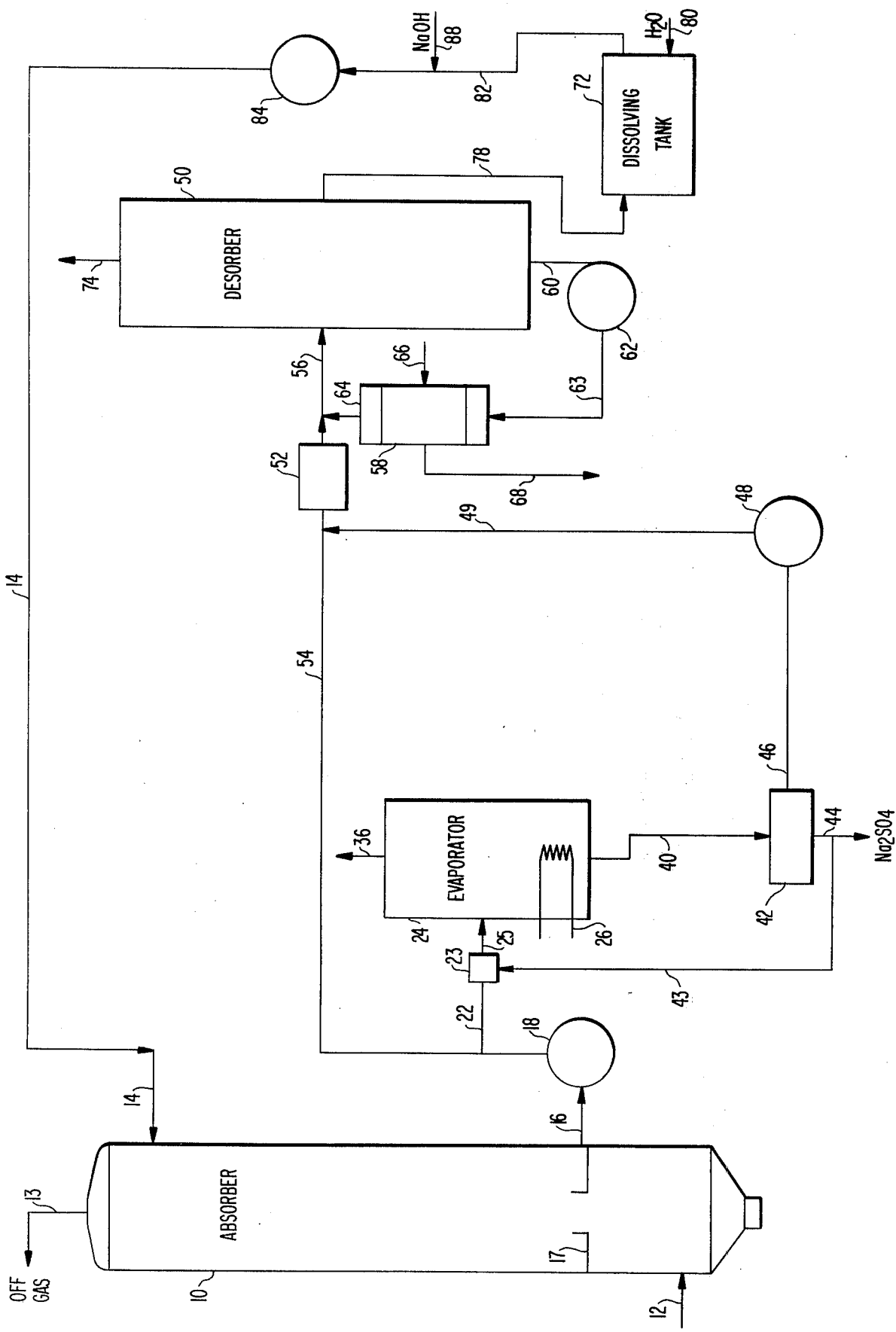

SULPHUR DIOXIDE REMOVAL PROCESS

This is a continuation of application Ser. No. 769,400, filed Feb. 16, 1977 now abandoned.

This invention relates to the removal of sulfur dioxide from gas streams by contact with an aqueous sodium sulfite solution to absorb sulfur dioxide and provide a solution richer in sodium bisulfite which can be treated to desorb sulfur dioxide and regenerate sodium sulfite for reuse. Sodium sulfate is formed as a by-product in the absorption-desorption medium and must be purged from the system without undue loss of valuable sodium compounds. More particularly, the invention concerns a process for reducing the loss of desirable and valuable sodium compounds from the cyclic sulfur dioxide removal system by separating undesirable sodium sulfate from the absorption-desorption medium as solids containing an increased concentration of sodium sulfate.

Sulfur dioxide is a recognized pollutant of the atmosphere and is produced by oxidation of sulfur or sulfur-bearing materials. Sulfur dioxide is found in significant amounts as a constituent of various waste gases such as smelter gases, off-gases from chemical plants, and stack or furnace gases from coal or oil-burning furnaces such as are used in electric power plants. Although the concentration of sulfur dioxide in such gases is generally small, e.g., from about 0.001 up to about 5 mole percent, and is frequently less than about 0.5 mole percent (less than about 1% by weight), the emission of sulfur dioxide may be substantial, particularly in industrial applications due to the large amount of sulfur-bearing material being processed. For instance, a modern electric plant having a 1,350,000 kw. capacity may burn up to about 15,000 tons of coal per day. Despite the fact that the concentration of sulfur dioxide in the stack gases from the electric plant can be low, e.g., of the order of 0.2 to 0.3 mole percent, the total sulfur dioxide produced may be in the neighborhood of 1,000 tons per day. Similarly, significant amounts of sulfur dioxide are produced in utilization of other fuels which may bear sulfur.

The removal of sulfur dioxide from sulfur dioxide-containing gases may be effected by treatment with an aqueous sodium sulfite solution. The operation of an efficient and economical system for removal of sulfur dioxide will be characterized not only by the efficiency of absorption of sulfur dioxide from the sulfur dioxide-containing gases, the efficiency of desorption of sulfur dioxide from the spent absorbing solution, and the purity of the sulfur dioxide product, but also by minimizing the loss of metal values. Sulfur dioxide-containing gas obtained, for instance, by burning sulfur-bearing mineral products and the like as fuels, can be contacted with sodium sulfite in an aqueous solution to form bisulfite, and thereby substantially reduce the sulfur dioxide content of the gas to, for instance, less than about 0.02 mole percent when the sulfur dioxide-containing gas comprises more than about 0.2 mole percent sulfur dioxide. The removal of sulfur dioxide from the gases is often up to about 95 percent or more. The spent absorbing solution can be heated to convert the bisulfite to sulfite and sulfur dioxide, and to generate a liquid or liquid-solid material which serves as the principal source of the absorbing solution. The sulfur dioxide can be drawn-off and cooled or compressed to provide a liquid product or sent as a gas to a sulfuric acid plant or sulfur plant. For additional information and further exemplification regarding sulfur dioxide removal systems which can advantageously employ the technology disclosed herein, see U.S. Pat. Nos. 3,607,037, 3,653,812, and 3,790,660, all of which are incorporated herein by reference.

The sulfur dioxide-containing gases to be treated in accordance with this invention, usually contain materials which facilitate oxidation such as sulfur trioxide, oxygen, elemental iron, and the like, and particularly when the gases containing sulfur dioxide are derived from the combustion of fuel, other materials which may be present include oxides of nitrogen. At least some of these materials promote the oxidation of the sodium sulfite or bisulfite to sulfate. Sodium sulfate is an inert material for purposes of the sulfur dioxide absorption-desorption process, because sulfate is not regenerated to sulfite during the desorbing operation. Sulfate build-up therefore occurs in the sulfur dioxide absorption-desorption system. A part of the absorbing-desorbing medium can be purged from the system to prevent unduly large amounts of inert sulfate from accumulating in the system. This purge may be a portion of the spent absorption solution or material obtained in the desorption of the sulfur dioxide from the absorbing solution. These purge materials, however, contain substantial amounts of sulfite or bisulfite, along with the sulfate, and when the purge is discarded, an undue expense may occur due to the accompanying loss of useable sodium values from the system which must be replaced by the addition of a suitable soluble sodium compound.

It has been proposed to purge sulfate from the absorption-desorption system more selectively with respect to sulfite or bisulfite values, and return the latter to the absorbing-desorbing system. A variety of these more selective sulfate purging systems are known and they generally involve the separation from the absorbing-desorbing medium of solids containing sodium sulfate in greater concentration on a non-aqueous basis than is present at any time in the aqueous medium cycling between the absorption and desorption zones of the sulfur dioxide removal process. A highly advantageous sulfate removal procedure is described in U.S. patent application Ser. No. 630,503, filed Nov. 19, 1975 (refiled as Ser. No. 949,545 on Oct. 10, 1978). In the process it is not necessary to reach temperatures substantially below ambient, and the sodium sulfate removed can be in an essentially non-hydrated or anhydrous form. Accordingly, at least a portion of the aqueous sodium sulfite-bisulfite, absorbing-desorbing medium containing a relatively large quantity, e.g. a major amount, of sodium bisulfite, a minor amount of sodium sulfate, and generally a minor amount of sodium sulfite, on a dry basis, is treated to remove some of the water and thereby precipitate a limited amount of sodium sulfate-containing solids from the solution, which solids have a higher sulfate concentration on a dry basis than the absorption-desorption medium from which they are formed. This treatment is continued for a sufficient length of time to ensure substantial precipitation of sodium sulfate, but it may be concluded before the slurry obtained from said medium contains substantially more than about 10 weight percent of precipitated solids derived from the absorption-desorption medium treated. The material preferably treated in accordance with the process is essentially spent absorption medium. In one manner of conducting the process, the removal of water and precipitation of solids may be effected without substantial conversion of bisulfite to sulfite and sulfur dioxide, e.g., there may be less than about 10 weight percent of the bisulfite so converted. The precipitated solids containing sodium sulfate can be readily removed from the resulting slurry by the use of conventional liquid-solid separation equipment to provide, at least initially, an essentially non-hydrated sulfate product which is relatively high in sodium sulfate content, advantageously at least about 50 weight percent, on a dry basis. The separated solids may contain a major amount of sodium sulfate, and a minor amount, if any, of sodium sulfite, preferably these amounts are at least about 60 or 70 weight percent sodium sulfate and less than about 30 or 40 weight percent sodium sulfite based on the total of these materials. The concentration of sodium sulfate in the precipitated solids is often at least about 2 times, on a dry basis, the concentration of sodium sulfate in the absorption-desorption medium from which the solids are formed by the evaporation of water.

There are other, less advantageous, systems for making the sodium sulfate removal more selective to reduce the loss of useable sodium values from the sulfur dioxide absorption-desorption cycle. For example, simple separation of sodium sulfate from sulfite and bisulfite in the spent absorbing solution by low temperature crystallization gives a hydrated sulfate-crystallization product containing minor amounts of sodium sulfite. In another system for concentrating sodium sulfate so that it can be more economically separated from the sulfur dioxide removal system described above, a purge stream of spent absorbing solution is contacted with a gas containing sulfur dioxide to convert at least a portion of the sodium sulfite to the more soluble bisulfite. The stream is then cooled to crystallizing temperatures of say about 0° to 10° C., and sodium sulfate precipitates more selectively.

As stated in said patent application Ser. No. 630,503, these alternative procedures have disadvantages compared with the process of that application. The processes have in common, however, the precipitation of a solid or crystalline material of higher sulfate content than would otherwise exist in the absorption-desorption system. The discard or withdrawal from the system of these precipitated solids of increased sulfate content represents a more selective removal of sulfate and thereby decreases the loss of useable sodium values, which makes the sulfur dioxide removal procedure more attractive from an economic standpoint. The present invention provides a means for further increasing the sodium sulfate concentration of the materials purged from these types of sulfur dioxide removal procedures, and the process of the invention is especially advantageous when it is applied to a system which embodies the process of said patent application Ser. No. 630,503.

In the present invention, a portion of the absorption-desorption medium used to separate sulfur dioxide from gases as described herein, is withdrawn from the cyclic absorption-desorption system and treated to precipitate solids having a higher concentration of sodium sulfate than is present, on a non-aqueous or dry basis, in the various media in the absorption-desorption system. In order to increase the concentration of sodium sulfate in such solids, a portion of the precipitated, sodium sulfate-containing solids is provided in solution in the absorbing-desorbing medium treated for sulfate removal. The amount of precipitated, sodium sulfate-containing solids so provided in solution, is sufficient to give a significant increase in the sodium sulfate content of the solids precipitated compared with a similar process in which the precipitated, sodium sulfate-containing solids are not so provided in the solution undergoing sodium sulfate removal. This increase in sodium sulfate concentration is over and above the amount of sodium sulfate-containing solids provided in solution in the absorption-desorption medium from which the solids are precipitated. The extent of such solids precipitated from solution is a minor amount of the absorption-desorption medium treated, e.g. up to about 10 weight percent of said absorption-desorption medium is precipitated as sodium sulfate-containing solids. This amount is thus stated on a fresh feed basis, and thus is over and above the amount of the previously precipitated sodium sulfate-containing solids provided in the medium undergoing treatment for sulfate removal. The extent of such solids precipitation may in some instances be up to about 20 weight percent on the stated basis, especially when the treating operation is conducted in the presence of sulfur dioxide-containing gas. Frequently, the extent of solids precipitation is up to about 7 weight percent on the stated basis, and often this amount is at least about 1 weight percent and, preferably, is about 3 to 7 weight percent. Generally, the portion of sodium sulfate-containing, precipitated solids provided in solution in the portion of absorption-desorption medium undergoing treatment for sulfate removal, is at least about 25 weight percent of the sodium sulfate-containing solids precipitated, and this amount may be up to about 75 weight percent or somewhat more. If, however, this amount is too great the sodium sulfate content of the precipitated solids may not be further increased and may even be lowered.

The material withdrawn from the absorption-desorption system for treatment for sulfate removal in accordance with this invention is sometimes herein referred to as a purge stream. The previously precipitated sodium sulfate-containing solids provided in solution in the withdrawn purge stream in accordance with this invention may often have a sodium sulfate concentration of at least about 50 weight percent, preferably at least about 60 weight percent, and the concentration may be up to about 80 or 85 weight percent, on a dry basis. The sodium sulfate which is provided as previously obtained solid precipitate resulting from the removal of water from the purge stream may be employed with or without further treatment to increase the sodium sulfate concentration of the separated solids on a dry basis. For example, it may be desirable to increase the sodium sulfate concentration of the precipitated solids by treatment with sulfur dioxide in the presence of a limited amount of water to convert solid sodium sulfite to sodium bisulfite which is dissolved in the water due to its greater solubility than that of sodium sulfite.

In the present invention the extent to which the concentration of the sodium sulfate is increased in the solids precipitated by the treatment of the purge stream is dependent on several factors such as the concentration of sodium sulfate in the purge stream withdrawn from the cyclic absorption-desorption stream, the type and conditions of treatment used to precipitate sodium sulfate-containing solids from the purge stream, the amount of sodium sulfate added to the treatment of the purge stream, and the purity of the added sodium sulfate. Generally, this increase in sodium sulfate content due to the provision of previously precipitated sodium sulfate-containing solids to the treating operation is at least about 5 or 7 weight percent, preferably at least about 10 weight percent, based on the total sodium sulfate, sodium sulfite and bisulfite present in the purge stream treated, and discounting the amount of sodium sulfate, as well as the sodium sulfite and any sodium bisulfite, in the previously precipitated solids, or in any other material, charged to the sulfate removal operation.

The precipitated sodium sulfate-containing solids which are added to the purge stream treating operation in accordance with this invention can be in any suitable physical form. It is preferred that a substantially solid, precipitated sodium sulfate-containing material be combined with the purge stream, since the addition of aqueous sodium sulfate-containing materials increases the amount of water to be removed from the absorption-desorption system when the mother liquor separated from the sodium sulfate-containing precipitate is added to such system. The addition of water is generally unnecessary to dissolve a suitable amount of the precipitated sodium sulfate-containing solids in the purge stream since the latter is usually unsaturated in these respects.

In the method of the present invention, the purge stream withdrawn from the aqueous absorption-desorption system for treatment for sulfate removal, contains in solution a major weight amount of sodium bisulfite, a minor amount of sodium sulfate, and generally a minor amount of sodium sulfite, based on the total of these components. The purge stream preferably contains these amounts of bisulfite and sulfite when withdrawn from the cyclic, sulfur dioxide absorption-desorption system and thus at the beginning of the treatment, but it may attain these concentrations in the liquid phase prior to or during the treatment, for instance, through contact with sulfur dioxide. The purge material which is withdrawn from the absorption-desorption system may contain at least about 25 weight percent of total salts, preferably at least about 30 weight percent, and often this amount may not exceed about 50 weight percent. The sodium sulfate content of this stream will usually not exceed about 15 or 20 weight percent, and preferably this amount will not be above about 10 or 12 weight percent. The sodium sulfate content of the stream is generally at least about 1 weight percent, and preferably is about 3 to 10 weight percent. Although to an extent the higher the sulfate content in the purge material treated, the purer is the sodium sulfate precipitated, an increase in the amount of inert sodium sulfate circulating in the absorption-desorption system has a detracting factor since there may be less active sodium present for a given amount of water in the system. As a result, a greater quantity of circulating material would be required to provide a given sulfur dioxide absorption-desorption capacity in the system. Often the absorbing-desorbing medium withdrawn for treatment has about 0.1 to 10 weight percent sodium sulfite and about 15 to 40 weight percent sodium bisulfite, based on the total of these components and the sodium sulfate and water present. The stream may contain minor amounts of other materials, e.g., sodium thiosulfate.

The purge stream which undergoes treatment for sodium sulfate precipitation generally contains prior to or during the treatment, a mole ratio of sodium bisulfite to sodium sulfite of at least about 2:1, often at least about 3:1, discounting any bisulfite and sulfite included with the previously precipitated sodium sulfate-containing solids added to the purge stream in accordance with this invention. The amount of sodium bisulfite in purge stream compared to the total active metal present may be alternatively expressed in terms of "s/c" which is defined as the number of moles of active sulfur, e.g., $SO_3^=$ and $HSO_3^-$, per 100 moles of water divided by the moles of active sodium per 100 moles of water. Thus, a pure sodium bisulfite solution would have an s/c of 1, and a pure sodium sulfite solution would have an s/c of 0.5. Sodium sulfate, for instance, does not provide active sulfur or active base. The s/c of the purge stream treated in accordance with the process of this invention is preferably about 0.85 to 0.97.

In accordance with a preferred form of the present invention, sodium sulfate is removed from the system by treating a portion of the aqueous absorption-desorption medium, preferably spent absorption solution, to remove a sufficient amount of water to precipitate a significant, but limited, amount of solids. Thus, the removal of water can be conducted in a manner to precipitate up to about 10 weight percent solids which are derived from the portion of the absorption-desorption medium being treated, and as stated above this amount may be up to about 20 weight percent, especially when water removal is performed while contacting the medium with added sulfur dioxide-containing gas. The sulfur dioxide-containing gas is preferably unsaturated with respect to water. Often the amount of solids precipitated from the portion of the absorption-desorption medium treated is at least about 1 weight percent, and preferably is up to about 7 weight percent, e.g., about 3 to 7 weight percent, on the basis of the absorption-desorption medium treated. Due to the provision of previously precipitated sodium sulfate-containing solids in the absorption-desorption medium being treated, the total amount of solids formed in the resulting slurry during water removal may often be at least about 2, say up to about 35 or 40, frequently about 5 to 20, weight percent based on the resulting slurry. The water content of the total material which is subjected to water removal may often be reduced by up to about 75 or more weight percent, preferably by at least about 10 weight percent, and the material generally remains sufficiently fluid to be readily pumpable. The operation is advantageously conducted at somewhat elevated temperatures which are sufficient to precipitate essentially non-hydrated crystals without excessive water removal. Generally, such temperatures are at least about 37° to 38° C., and to be more certain of having temperatures sufficient to form a non-hydrated product when it is precipitated, a temperature of at least about 40° C. is recommended. Suitable temperatures for accomplishing the desired evaporation of water thus include about 40° to 120° C., preferably about 40° to 100° C. The choice of temperature may depend on the pressure employed, and the pressure may be ambient, reduced or elevated. Preferably, the pressure is about 10 to 20 psia.

The slurry obtained in the treatment of the purge stream in accordance with this invention is subjected to liquid-solid separation to provide a separate solid phase which is relatively high in sulfate content. The separation may be done without substantially altering the temperature of the slurry, and especially when the precipitation occurs as the result of the evaporation of water the temperature of the liquid-solid separation may often be about 40° to 120° C., preferably about 40° to 100° C. The separated liquid phase or mother liquor can be charged to the absorption-desorption system, and preferably to its desorption zone. The separated solids may, if desired, be dried and they may undergo self-drying upon standing by the free water being taken up as water of hydration.

The amount of solids formed in the purge stream of the process of this invention, and subsequently removed from the system, is sufficient to prevent undue build-up of sodium sulfate in the absorption-desorption system. The amount of sulfate so purged is preferably substantially equal to the amount of sulfate being formed in the absorption-desorption system when taking into account any sulfate which is removed from the cyclic system by other means. Also, the amount of solids required to be removed from the system may depend on the purity of the sulfate in the precipitated and separated solid phase, as well as the amount of the total absorption-desorption medium which is subjected to the sulfate removal operation. Generally, as the percentage of solids precipitated in the purge stream decreases, the purity of the precipitated sulfate increases.

In the process of this invention, only a portion of the cycling absorption-desorption medium is treated for sulfate removal, and this amount may be at least about 5 weight percent of the total medium cycled through the absorption-desorption system in any given time period. Often this amount is up to about 50 weight percent, preferably about 15 to 30 weight percent. The liquid medium or mother liquor separated in the sulfate removal procedure is usually passed to the sulfur dioxide desorption stage since the liquid is high in bisulfite content. Depending on the amount of the mother liquor to be recycled, it may be desirable to charge it to some other part of the absorption-desorption system. Make-up sodium values in the form of suitable water-soluble sodium compounds such as sodium carbonates or hydroxide, may be added to the system of this invention to replace sodium loss, including any removed in the sodium sulfate solids which are precipitated and not added to the purge treatment. Advantageously, the addition of the soluble sodium compound is to the lean absorbing solution to which make-up water may also be added.

In the sulfur dioxide desorption stage of the method of this invention, the spent absorption medium may be subjected to elevated temperatures to convert sodium bisulfite into sodium sulfite with the concomitant formation of a vapor phase containing sulfur dioxide and water. Suitable temperatures for this operation include about 40° to 110° C., preferably about 60° to 100° C. The pressure may be about 3 to 21 psia, preferably about 8 to 15 psia. The vapor phase can be treated for the recovery of purer sulfur dioxide, the manufacture of sulfur, or used, treated or disposed of in any other suitable manner. Various procedures for sulfur dioxide desorption can be used and a number are known in the art. It is preferred, however, that the desorption be accomplished with the simultaneous formation of an undissolved solids or crystal phase which enables the desorption to be accomplished with the use of lesser amounts of heat. In such operations the amount of undissolved solids in the desorption zone is generally at least about 15 weight percent of the slurry undergoing decomposition or sulfur dioxide desorption. As described in U.S. Pat. No. 3,790,660, the amount of such solids is advantageously at least about 25 weight percent in order to alleviate difficulties of equipment fouling, particularly when supplying heat to the desorption zone by passing the slurry through the tubes of an indirect heat exchanger. Preferably, the amount of undissolved solids is about 30 to 60 weight percent of the slurry undergoing decomposition. Also, when the amount of undissolved solids is sufficiently high, the sodium sulfite content of the slurry may be adequate for a portion of the total slurry undergoing decomposition to be withdrawn and combined with water to dissolve the solids, and the resulting solution can be used as the lean solution for absorbing sulfur dioxide from the gas being treated in the absorption zone of the absorption-desorption system. The lean absorbing solution is usually composed to a major weight extent of sodium sulfite and minor weight amounts of sodium bisulfite and sodium sulfate based on the total amount of these salts present. Often the lean absorbing solution has about 10 to 35 weight percent sodium sulfite, about 3 to 15 weight percent sodium bisulfite, and about 1 to 10 weight percent sodium sulfate based on these components and water present.

The present invention will be further described by reference to the drawing which is a schematic flow diagram of a process employing the present invention in an absorption-desorption system using sodium sulfite for removal and recovery of sulfur dioxide from flue gas. Equipment such as valves, pumps, heat exchangers, surge tanks, and the like, which would be used in a commercial embodiment of the invention and in the operation of an absorption-desorption system, is not shown since it can be of conventional design and employed in accordance with practices well known in the art.

Referring to the drawing, sulfur dioxide-containing flue gas, which may, for example, contain from about 0.05 to about 5 mole percent sulfur dioxide, enters absorber vessel 10 by way of line 12 near the bottom thereof. Water or other aqueous liquid may be passed co-currently with the flue gas to a bed of column packing in the lower portion of vessel 10 to scrub the gas to remove suspended solids such as fly-ash and the relatively high water-soluble components, for instance, sulfur trioxide, hydrogen chloride, and the like, from the flue gas.

The flue gas passes upwardly through absorber 10 and liquid-gas contacting means such as sieve trays and through a descending flow of lean absorbing solution which is supplied to vessel 10 by line 14. The lean absorbing solution contains sodium sulfite as the essential sulfur dioxide-absorbing component. Absorber 10 may employ other types of liquid-gas contacting structures, such as packing, bubble caps, alternate ring and discs or the like. The lean absorbing solution in line 14 is often at a temperature of at least about 30° C., preferably at least about 40° C., up to about 110° C., preferably up to about 70° C. Flow rates of the aqueous absorbing solution through the absorption zone can be adjusted according to the sulfur dioxide concentration in the gas being treated, and the concentration of sodium sulfite in the solution, so that a major amount, e.g., up to about 95% or more, of the sulfur dioxide may be removed from the gas by reaction with the lean absorbing solution. The treated gas leaves absorber 10 by way of line 13. Spent absorbing solution is collected on gas-passing tray 17 in absorber 10 and removed from the latter by line 16.

The spent absorbing solution is transferred by pump 18 and line 54 to heater 52 and thence by line 56 to desorber 50. A portion of the spent absorbing solution is withdrawn from line 54 by line 22. The stream in line 22 containing sodium sulfate, as well as sodium sulfite and bisulfite, in solution is passed to mixing tank 23 and combined with solids added as shown by line 43. The resulting mixture is passed to evaporator or dehydrator 24 by way of line 25. Heat may be supplied to evaporator 24 by steam coil 26, and the added heat serves to cause the removal of water from the spent absorbing solution and the precipitation of sodium sulfate-containing solids. The water and any sulfur dioxide in the vapor phase in evaporator 24 are removed by line 36.

A portion of the spent absorbing medium undergoing dehydration in evaporator 24 is withdrawn via line 40 and passed to crystal separator 42 which may be selected from conventional processing equipment for effecting separation of solids and liquids such as filters, including rotary filters, centrifuges, clarifiers and other sedimentation equipment. Solids rich in sodium sulfate crystals and containing sodium sulfite can be removed as shown by line 44, and the resulting liquid stream can be sent via line 46, pump 48, lines 49 and 54, heater 52 and line 56 to desorber 50 for processing to desorb sulfur dioxide and to regenerate the absorbing solution. In accordance with this invention, a portion, e.g. about 50 weight %, of the solids removed is charged to tank 23 as shown by line 43 to dissolve the crystals in the material added to tank 23 from line 22, and the resulting mixture is passed by line 25 to evaporator 24 as afore described. The remaining portion of the solids separated is removed from the system as the purged material.

The desorber section of the system, which can be operated in the manner, for example, shown in U.S. Pat. No. 3,790,660, is for convenience shown as a single stage desorber, but two or more stages may be used. The heated solution in line 56 is introduced into the desorber 50. The conditions of temperature, pressure, and residence time in desorber 50 are so maintained as to effect the desired decomposition of sodium bisulfite, evaporation of sulfur dioxide and water, and precipitation of sodium sulfite-containing crystals as described above and in said patent.

To supply heat to desorbing vessel 50 a recycle stream is heated in heat exchanger 58. In order to effect heating in vessel 50, the slurry in the vessle is withdrawn by line 60, and passes through pump 62, line 63, metallic tubes of heat exchanger 58 and back to vessel 50 by way of lines 64 and 56. Steam is introduced to heat exchanger 58 through line 66 as the prime energy source for the desorption zone. The condensate (water) from heat exchanger 58 is removed through line 68. The sulfur dioxide and water vapors from desorber 50 are removed by line 74. A portion of the slurry in desorber 50 is passed to dissolving tank 74 by way of line 78. Since water has been removed from the absorption solution during desorption, make-up water, for example, from rectification (not shown), is supplied to tank 72 through line 80. The solution formed in dissolving tank 72 passes through line 82, pump 84, and line 14 to absorber 10. Make-up sodium ion, which may be an aqueous sodium hydroxide or carbonate solution, is added to line 82 through line 88.

Other ways of conducting the precipitation of sulfate-containing solids from the absorption-desorption medium may be used in conducting the method of this invention. For example, water may be removed from the medium by contact with a sulfur dioxide-containing gas which is unsaturated with water as described in patent application Ser. No. 647,516, filed Jan. 8, 1976, in the names of Edgar E. Bailey, Norman E. Nicholson, John Frederick Flintoff and John Scarlett, herein incorporated by reference.

The following examples will further illustrate the present invention.

EXAMPLE I

This example relates to the evaporative treatment of a spent absorber solution which can be obtained in an operation of the type shown in the drawing. The evaporation conditions include the use of vacuum at a temperature of about 90° C. to form the indicated amount of solids in the spent absorbing solution. The crystals are separated from the mother liquor at the temperature of evaporation. The sulfate which is added in Run 2 is supplied as a mixture of crystals equivalent to the composition and weight of the dry crystals obtained in Run 1 to which there is no sulfate addition. The sulfate added in Run 3 is supplied as a mixture of crystals equivalent to the composition and 50% of the weight of dry crystals obtained in Run 2. The most pertinent data obtained in these runs are in Table I.

Table I

|  | Run No. |  | 1 | 2 | 3 |
|---|---|---|---|---|---|
| SPENT ABSORBER SOLUTION ANALYSIS | $Na_2SO_3$ | % wt. | 5.7 | 6.9 | 6.7 |
| | $NaHSO_3$ (calc. as $Na_2S_2O_5$) | % wt. | 21.0 | 20.2 | 20.2 |
| | $Na_2SO_4$ | % wt. | 7.1 | 9.1 | 9.3 |
| | $Na_2S_2O_3$ | % wt. | 0.3 | 0.3 | 0.3 |
| | $H_2O$ (by diff) | % wt. | 65.9 | 63.5 | 63.5 |
| | Vol. | ccs | 500 | | |
| | Wt. | g | 650 | 675 (including 25 grams of precipitated solids from Run 1) | 675 (including 25 grams of precipitated solids from Run 2) |
| EVAPORATION PRECIPITATED SOLIDS | WATER REMOVED CONTENT OF SLURRY FROM EVAPORATION* | g | 149.5 | 149.5 | 149.5 |
| | | % wt. | 5.0 | 9.5 | 9.5 |
| | WEIGHT OF SOLIDS | g | 25 | 50 | 50 |
| MOTHER LIQUOR ANALYSIS | $Na_2SO_3$ | % wt. | 6.7 | 7.4 | 7.4 |
| | $NaHSO_3$ (calc. as $Na_2S_2O_5$) | % wt. | 27.3 | 27.3 | 27.3 |
| | $Na_2SO_4$ | % wt. | 6.5 | 5.8 | 5.8 |
| | $Na_2S_2O_3$ | % wt. | 0.4 | 0.4 | 0.4 |
| | $H_2O$ (by diff.) | % wt. | 59.1 | 59.1 | 59.1 |
| DRY | $Na_2SO_3$ | % wt. | 38.4 | 31.8 | 28.9 |

Table I-continued

| | Run No. | | 1 | 2 | 3 |
|---|---|---|---|---|---|
| CRYSTALS ANALYSIS** | NaHSO₃ (calc. as NA₂S₂O₅) | % wt. | — | | |
| | Na₂SO₄ | % wt. | 61.6 | 68.2 | 71.1 |
| | H₂O (by diff.) | % wt. | | | |
| SULFATE ADDITION TO SPENT ABSORBER SOLUTION | TOTAL DRY CRYSTALS | g | 0 | 25 | 25 |
| | AMOUNT OF Na₂SO₄ | g | 0 | 15.4 | 17.0 |

*Reported on basis of total solids precipitated of which in Runs 2 and 3 about 45% and 48%, respectively, are recycled sodium sulfate so that the % solids in the slurry produced from the spent absorber solution feed is about 55% and 52%, respectively, of the total reported.

**Calculated free of mother liquor and expected on a dry basis. The data of Table I illustrate the effect of adding sodium sulfate to the spent absorbing solution prior to the removal of water for solids precipitation (Runs 2 & 3) when compared without such addition (Run 1). After only three runs, the undissolved solids in the evaporator contain over 71 weight percent sodium sulfate, and about 7.1 grams of sodium sulfite are removed from the system with 17.8 grams of sodium sulfate. On the other hand, if the evaporation were conducted without recycling of sulfate to the evaporator, the sulfate concentration of the undissolved solids would remain as in Run 1, i.e., 61.6 weight percent, and about 9.6 grams of sodium sulfite with 15.4 grams of sodium sulfate would be removed from the system.

EXAMPLE II

The procedure of Example I is essentially repeated except that the amount of water removed and the amount of added sodium sulfate are sufficient to provide undissolved solids in the evaporator containing about 80.6 weight percent sodium sulfate on a dry basis. The sulfate which is added in Run 2 is supplied as a mixture of solids equivalent to the composition and weight of the dry solids obtained in Run 1 to which there is no sulfate addition. The amount of water evaporated in Run 2 is sufficient to provide about 27 grams of precipitate which have approximately the desired 80.6 weight percent sodium sulfate on a dry basis. The sulfate added in Run 3 is supplied as a mixture of solids equivalent to the composition of the dry crystals obtained in Run 2 and is supplied in an amount of 27 grams of total solids. The most pertinent data obtained in these tests are in Table II.

TABLE II

| | Run No. | | 1 | 2 | 3 |
|---|---|---|---|---|---|
| SPENT ABSORBER SOLUTION ANALYSIS | Na₂SO₃ | % wt. | 5.7 | 6.9 | 6.3 |
| | NaHSO₃ (calc. as Na₂S₂O₅) | % wt. | 21.0 | 20.2 | 20.2 |
| | Na₂SO₄ | % wt. | 7.1 | 9.1 | 10.0 |
| | Na₂S₂O₃ | % wt. | 0.3 | 0.3 | 0.3 |
| | H₂O (by diff.) | % wt. | 65.9 | 63.5 | 63.3 |
| | Vol. | ccs | 500 | | |
| | Wt. | g | 650 | 675 (including 25 grams of precipitated solids from Run 1) | 677 (including 27 grams of precipitated solids from Run 2) |
| EVAPORATION | WATER REMOVED | g | 149.5 | 133 | 148.5 |
| PRECIPITATED SOLIDS | CONTENT OF SLURRY FROM EVAPORATION* | % wt. | 5.0 | 5.0 | 8.9 |
| | WEIGHT OF SOLIDS | g | 25 | 27.1 | 47 |
| MOTHER LIQUOR ANALYSIS | Na₂SO₃ | % wt. | 6.7 | 8.8 | 7.8 |
| | NaHSO₃ (calc. as Na₂S₂O₅) | % wt. | 27.3 | 25.5 | 27.0 |
| | Na₂SO₄ | % wt. | 6.5 | 7.7 | 6.2 |
| | Na₂S₂O₃ | % wt. | 0.4 | 0.4 | 0.4 |
| | H₂O (by diff.) | % wt. | 59.1 | 57.7 | 58.6 |
| DRY CRYSTALS ANALYSIS** | Na₂SO₃ | % wt. | 38.4 | 19.4 | 19.4 |
| | NaHSO₃ (calc. as Na₂S₂O₅) | % wt. | — | | |
| | Na₂SO₄ | % wt. | 61.6 | 80.6 | 80.6 |
| | H₂O (by diff.) | % wt. | — | | |
| SULFATE ADDITION TO SPENT ABSORBER | TOTAL DRY CRYSTALS | g | 0 | 25 | 27 |
| | AMOUNT OF Na₂SO₄ | g | 0 | 15.4 | 21.8 |

TABLE II-continued

| Run No. | 1 | 2 | 3 |
|---|---|---|---|
| SOLUTION | | | |

*Reported on basis of total solids precipitated and thus the solids precipitated in Run 3 which are produced from the spent absorber feed is about 23% of the total reported (about 20 grams).
**Calculated free of mother liquor and expected on a dry basis.

The data of Table II illustrate the effect of adding sodium sulfate to the spent absorbing solution prior to the removal of water for solids precipitation (Run 3) when compared without such addition (Run 1). In Run 3, the undissolved solids in the evaporator contain about 81 weight percent sodium sulfate, and about 3.9 grams of sodium sulfite with 16.1 grams of sodium sulfate are removed from the system. In Run 1 without the sulfate addition the undissolved solids in the evaporator contain about 62 weight percent sodium sulfate, and about 9.6 grams of sodium sulfite with 16.1 grams of sodium sulfate are removed from the system.

Various modifications and equivalents of the process of this invention will be apparent to one skilled in the art, and may be made without departing from the spirit or scope of the invention.

It is claimed:

1. In a process for the removal of sulfur dioxide from gas in which sulfur dioxide is absorbed from the gas in an aqueous absorption solution of sodium sulfite to form the corresponding bisulfite, resulting bisulfite-containing absorption solution is desorbed to form sulfur dioxide, and a sulfite-containing absorption solution is regenerated for recycling, and in which sodium sulfate is in solution in the spent absorption medium from said absorption, the improvement for removing sulfate from the system which comprises evaporating water from a portion of said spent absorption medium which contains in solution sodium bisulfite, about 1 to 10 weight percent of sodium sulfate and about 0.1 to 10 weight percent of sodium sulfite, said spent absorption medium having a major amount of sodium bisulfite on a dry basis, at a temperature of about 37° to 120° C. to precipitate about 1 to 20 weight percent based on said spent absorption medium of solids derived from said spent absorption medium, said precipitated solids containing a major amount of sodium sulfate and a minor amount of sodium sulfite, separating sulfate- and sulfite-containing precipitate and bisulfite-containing solution from resulting slurry, providing sufficient of said precipitated sodium sulfate- and sulfite-containing solids derived from said portion of spent absorption medium, in solution in said spent absorbing medium from which said solids are precipitated by evaporation of water to increase the sodium sulfate concentration in said solids, and desorbing sulfur dioxide from said bisulfite-containing solution.

2. The process of claim 1 in which the desportion is conducted with a slurry containing dissolved bisulfite and sodium sulfite solids, said slurry containing at least about 25 weight percent of undissolved solids.

3. A process of claim 1 in which the slurry resulting from said precipitation contains about 1 to 10 weight percent based on said spent absorption-desorption medium of solids derived from said medium, and said undissolved solids contain at least about 50 weight percent of sodium sulfate.

4. The process of claim 3 in which the desorption is conducted in a slurry containing dissolved bisulfite and sodium sulfite solids, said slurry containing at least about 25 weight percent of undissolved solids.

5. The process of claim 1, 3 or 4 in which said portion of precipitated sodium sulfate- and sulfite-containing solids provided in solution in said aqueous absorption-desorption medium from which said solids are precipitated comprises about 25 to 75 weight percent of the solids precipitated from said medium.

6. The process of claim 1, 3 or 4 in which the total amount of solids present during said precipitating is about 2 to 40 weight % of the resulting slurry.

7. A process of claim 6 in which said undissolved solids in said slurry in said desorption are dissolved to obtain lean absorption solution containing a major amount of sodium sulfite and minor amounts of sodium bisulfite and sodium sulfate based on the total weight of these salts, and in which said lean absorption solution is employed to absorb sulfur dioxide from said gas.

8. The process of claim 6 in which said portion of precipitated sodium sulfate- and sulfite-containing solids provided in solution in said aqueous absorption-desorption medium from which said solids are precipitated comprise about 25 to 75 weight percent of the solids precipitated from said medium.

9. In a process for the removal of sulfur dioxide from gas in which sulfur dioxide is absorbed from the gas in an aqueous absorption solution of sodium sulfite to form the corresponding bisulfite, resulting bisulfite-containing absorption solution is desorbed to form sulfur dioxide, and a sulfite-containing absorption solution is regenerated for recycling, and in which sodium sulfate is in solution in the spent absorption medium from said absorption, the improvement for removing sulfate from the system which comprises evaporating water from a portion of said spent absorption medium which contains in solution sodium bisulfite, about 1 to 10 weight percent of sodium sulfate and about 0.1 to 10 weight percent of sodium sulfite, said spent absorption medium having a major amount of sodium bisulfite on a dry basis, at a temperature of about 40 to 120° C. to precipitate about 1 to 10 weight percent based on said spent absorption medium of solids derived from said spent absorption medium, said precipitated solids containing a major amount of sodium sulfate and a minor amount of sodium sulfite, separating sulfate- and sulfite-containing precipitate and bisulfite-containing solution from resulting slurry, providing about 25 to 75 weight percent of said precipitated sodium sulfate- and sulfite-containing solids derived from said portion of spent absorption medium, in solution in said spent absorbing medium from which said solids are precipitated by evaporation of water, and desorbing sulfur dioxide from said bisulfite-containing solution.

10. The process of claim 9 in which the spent absorbing solution has an s/c of about 0.85 to 0.97.

11. The process of claim 10 in which the desorption is conducted with a slurry containing dissolved bisulfite and sodium sulfite solids, said slurry containing at least about 25 weight percent of undissolved solids.

12. The process of claim 11 in which said resulting slurry from which precipitate is separated contains about 5 to 20 weight percent of solids which contain at least about 60 weight percent of sodium sulfate.

13. The process of claim 9, 10, 11 or 12 in which the total amount of solids present during said precipitating is about 2 to B 40 weight % of the resulting slurry.

14. A process of claim 13 in which said undissolved solids in said slurry in said desorption are dissolved to obtain lean absorption solution containing a major amount of sodium sulfite and minor amounts of sodium bisulfite and sodium sulfate based on the total weight of these salts, and in which said lean absorption solution is employed to absorb sulfur dioxide from said gas.

15. The process of claim 14 in which the total amount of solids present during said precipitating is about 2 to 40 weight % of the resulting slurry.

* * * * *